United States Patent
Uehara

[11] 4,249,793
[45] Feb. 10, 1981

[54] ERECT TYPE ZOOM TELESCOPIC OPTICAL SYSTEM

[75] Inventor: Makoto Uehara, Yokohama, Japan

[73] Assignee: Nippon Kogaku K.K., Tokyo, Japan

[21] Appl. No.: 27,485

[22] Filed: Apr. 5, 1979

[30] Foreign Application Priority Data

Apr. 7, 1978 [JP] Japan .................................. 53/40235

[51] Int. Cl.³ ...................... G02B 15/18; B02B 25/00; G02B 23/00
[52] U.S. Cl. ...................................... 350/43; 350/410; 350/423; 350/446
[58] Field of Search .................. 350/43, 203, 184, 186

[56] References Cited

U.S. PATENT DOCUMENTS

| | | | |
|---|---|---|---|
| 1,464,655 | 8/1923 | Jacob | 350/184 |
| 3,286,592 | 11/1966 | Wagner et al. | 350/203 |
| 3,360,325 | 12/1967 | Gustafson | 350/203 |
| 3,619,035 | 11/1971 | Hopkins | 350/43 |
| 3,947,084 | 3/1976 | Noyes | 350/2 |

*Primary Examiner*—Conrad J. Clark
*Attorney, Agent, or Firm*—Shapiro and Shapiro

[57] ABSTRACT

This invention provides an erect type zoom telescopic optical system for a binocular or monocular telescope which consists of a positive lens group nearest to an object, a variator group, a compensator group, an image erect prism positioned between the variator and compensator groups, a field stop positioned at a predetermined definite position where the image of the object is formed by said compensator group movable along the optical axis interlocking with the variator group, and an eye-piece for observing the image of the object formed at the field stop. This invention provides a compact size system with high quality compensating aberrations.

8 Claims, 3 Drawing Figures

ERECT TYPE ZOOM TELESCOPIC OPTICAL SYSTEM

BACKGROUND OF THE INVENTION

1. Field of the Invention

This invention relates to an erect type zoom telescopic optical system for a binocular or monocular telescope having objective lens system, eye-piece lens system and erect prism for erecting an image.

2. Description of the Prior Art

Telescopes for observing a space image formed by an objective lens system through an eye-piece lens system is known as Kepler type and binocular or monocular telescope of this type has been used for a long time. In binocular telescope two optical systems are arranged in parellel and these two optical systems are equivalent except diopter correction for left or right eyes, respectively. Monocular telescope consists of one of these two optical systems so that in the following we use simply the term binocular to cover both binocular and monocular telescopes.

In such binocular, there has been already known zoom binocular which enables to continuously change magnification. In case of so-called eye-piece zoom in which magnification of eye-piece lens system is changed, it is possible to obtain a relatively simple structure as aperture of eye-piece itself is small. Owing to the face that magnification is varied within eye-piece lens system having a short focal length, however, it is extremely difficult to correct aberrations through a wide range of field of view while maintaining eye relief, which is a distance between eye point and an exit light side surface of eye-piece lens, at a predetermined length. As a result, it is only realized for a narrow range of field. Further, in general, since field stop is fixed, apparent field of view is changed as magnification varies. Especially, in middle type eye-piece zoom; which is called as eye-piece-objective zoom, in which a space image is formed by objective within eye-piece, the field stop does not sufficiently play a role as a stop due to the fact that lenses sandwiching field stop are moved and so image is moved relative to fixed stop. This problem can be solved by interlocking the stop to the movement of lenses at the time of zooming operation and varying the aperture size of the stop, however, this requires a complex structure.

On the other hand, in case of varying the magnification by objective lens, which is called as objective zooming, the whole system becomes bulky and complex as the zooming operation is performed by the movement of the objective having a large aperture. For making the size of the zooming system of the objective small, the refractive power of each lens must be large, which result in the deterioration of aberrations and practical small size zoom binocular could not be attained.

SUMMARY OF THE INVENTION

The main object of this invention is to overcome above mentioned defects and provide an erect type zoom optical system for binocular telescope having simple structure, compact size and high quality image formation.

The zoom optical system of this invention is in principle of the so-called objective zooming type and comprises within the objective system a variator group movable along the optical axis for zooming, a compensator group interlocking with the variator group so as to form the image of an object at a predetermined position and an erect prism to obtain an erect image arranged between the variator and compensator groups.

DESCRIPTION OF THE PREFERRED EMBODIMENTS

Figure 1:
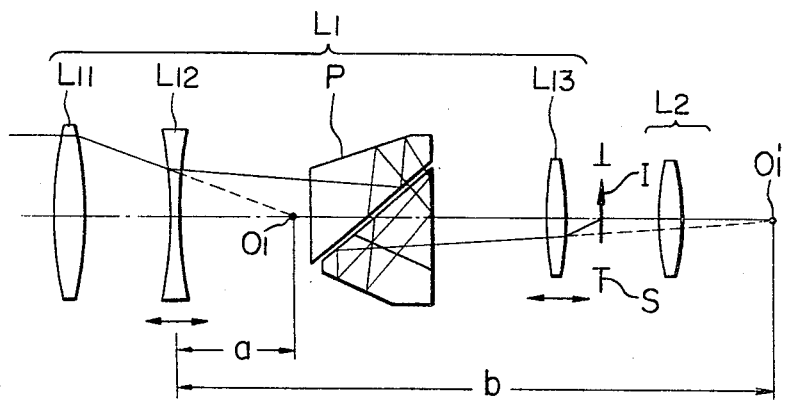
FIG. 1 shows the principle of the arrangement of an erect type zoom binocular optical system of this invention and, FIGS. 2A and 2B show a preferred embodiment of the invention, FIG. 2A illustrating the low magnification state (e.g. $6^x$) and FIG. 2B illustrating the high magnification state (e.g. $12^x$).

FIG. 1 shows a principle of the present invention. The objective lens system $L_1$ comprises focusing group $L_{11}$ having a positive refractive power and moving along the optical axis for focusing according to the distance to an object from the binocular, variator group $L_{12}$ having a negative refractive power, compensator group $L_{13}$ having a positive refractive power and erect prism P arranged between the variator group $L_{12}$ and the compensator group $L_{13}$. The variator group $L_{12}$ and compensator group $L_{13}$ are interlockingly movable along the optical axis and by this movement the image I of an object is focused on the fixed field stop S continuously varying the magnification. This image I is enlarged and observed through eye-piece lens system $L_2$.

The erect prism which is indispensable in binocular requires a relatively long optical path length. In this invention, since erect prism is arranged between the variator group $L_{12}$ and compensator group $L_{13}$, the distance between the two groups are relatively long and the variator group $L_{12}$ has relatively small negative refractive power. In other words, the absolute value of the refractive power of the variator group $L_{12}$ is smaller than that of the focusing group $L_{11}$. In concrete, for making the individual magnification of the variator group as positive, the value of b/a is designed to have a positive value, where a being optical distance to the apparent point $O_1$ of an object of the variator group and b being optical distance to the apparent image point $O'_1$. In FIG. 1, b shows geometrical distance for simplicity. Consequently, it is possible to compensate aberrations over the whole zooming area with a single negative variator lens. Moreover, since the refractive power of the variator group is negative, the focusing group and variator group from the telephoto type and become small and it is possible to minimize the aperture size of the erect prism and the whole system becomes compact.

The erect prism P may be fixed relative to the space image I, or may be arranged to move as a unit with either variator group $L_{12}$ or compensator group $L_{13}$.

The erect prism as shown in the drawing has a function of stop and when the lens, which is moved in zooming operation, moves as a unit with the erect prism it is possible to design exit pupile diameter as constant by properly selecting the distance between said zooming lens and the prism.

Figure 2A:
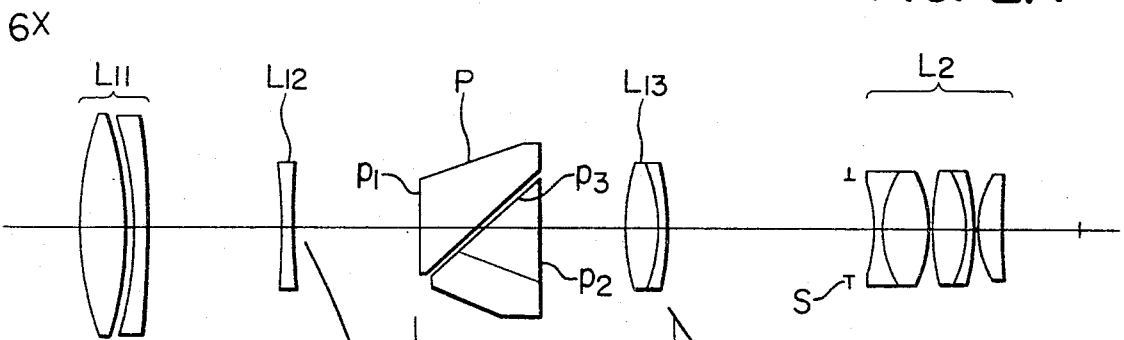
Figure 2B:
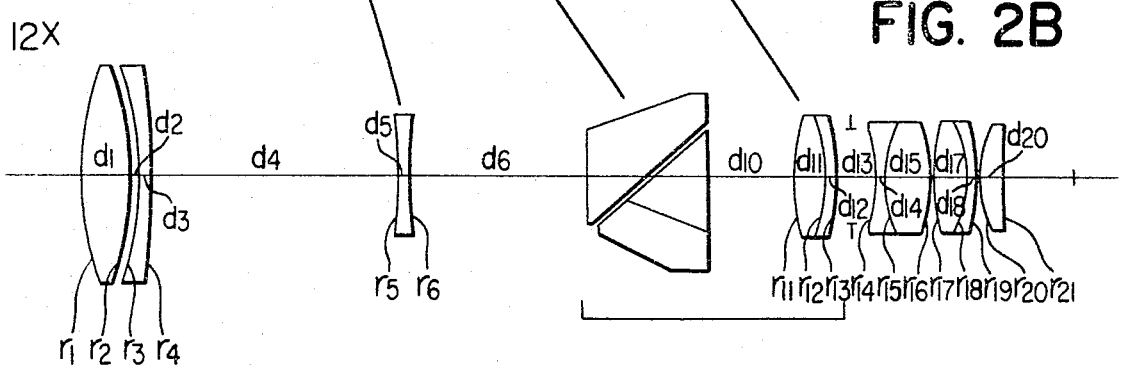

Now, the explanation will be made with respect to the preferred embodiment of this invention as shown in FIGS. 2A and 2B. In this embodiment, positive lens group $L_{11}$ for focusing consists of biconvex positive lens component and separated negative meniscus lens component having a convex surface toward the image side, the variator group $L_{12}$ consists of biconcave negative lens component, the image erect prism member P is a so-called Pechan prism, and the compensator group $L_{13}$ is a cemented biconvex positive lens component. The eye-piece $L_2$ consists in order from the object side of a cemented positive meniscus lens component convex toward the image side having a cemented surface convex toward the object side, biconvex positive lens component having a cemented surface convex toward image side and a positive lens component having a strongly curved surface toward the object side. FIG. 2A illustrates the low magnification state and FIG. 2B shows the high magnification state. Image erect prism P is movable along the optical axis as a unit together with the compensator group $L_{13}$ and the stops are provided at the light incident surface $P_1$, exit surface $P_2$ and the separating surface $P_3$, respectively. Consequently, when the variator group $L_{12}$ and compensator group $L_{13}$ are moved for magnification, the image erect prism P is also moved and with the aid of stops provided at the prism P, the exit pupil diameter for the whole of the binocular is kept always constant. Thus in case of observing an object at different magnifications brightness is kept unchanged which is convenient for the observation.

The data of this embodiment is shown below, in which r, d, n and $\nu$ denote radius of curvature, distance between adjacent surfaces, refractive index and Abbe number of each lens component:

| magnification $6^x$–$12^x$ | exit pupil diameter 3.0 mm |
|---|---|
| real field of view 10°–5° | apparent field of view 60° |
| eye relief 12.3 | |

| | | | | |
|---|---|---|---|---|
| $L_{11}$ | $r_1=60.5$ | $d_1=8.0$ | $n_1 = 1.51680$ | $\nu_1 = 64.2$ |
| | $r_2=-60.5$ | $d_2=1.6$ | | |
| | $r_3=-58.0$ | $d_3=2.0$ | $n_2 = 1.74950$ | $\nu_2 = 35.1$ |
| | $r_4=-157.731$ | $d_4=23.376$ $\sim 43.404$ | | |
| $L_{12}$ | $r_5=-120.0$ | $d_5=2.0$ | $n_3 = 1.51680$ | $\nu_3 = 64.2$ |
| | $r_6=153.577$ | $d_6=22.056$ $\sim 30.806$ | | |
| P | $r_7=\infty$ | $d_7=29.66$ | $n_4 = 1.56883$ | $\nu_4 = 56.0$ |
| | $r_8=\infty$ | $d_8=0.4$ | | |
| | $r_9=\infty$ | $d_9=46.96$ | $n_5 = 1.56883$ | $\nu_5 = 56.0$ |
| | $r_{10}=\infty$ | $d_{10}=14.989$ | | |
| $L_{13}$ | $r_{11}=49.016$ | $d_{11}=5.5$ | $n_6 = 1.60311$ | $\nu_6 = 60.7$ |
| | $r_{12}=-25.0$ | $d_{12}=1.5$ | $n_7 = 1.75520$ | $\nu_7 = 27.5$ |
| | $r_{13}=-53.2$ | $d_{13}=35.447$ $\sim 6.852$ | | |
| $L_2$ | $r_{14}=-29.5$ | $d_{14}=1.5$ | $n_8 = 1.80518$ | $\nu_8 = 25.5$ |
| | $r_{15}=17.4$ | $d_{15}=8.5$ | $n_9 = 1.62041$ | $\nu_9 = 60.3$ |
| | $r_{16}=-20.2$ | $d_{16}=0.2$ | | |
| | $r_{17}=50.0$ | $d_{17}=6.0$ | $n_{10} = 1.62041$ | $\nu_{10} = 60.3$ |
| | $r_{18}=-17.4$ | $d_{18}=1.5$ | $n_{11} = 1.80518$ | $\nu_{11} = 25.5$ |
| | $r_{19}=-50.0$ | $d_{19}=0.2$ | | |
| | $r_{20}=16.6$ | $d_{20}=4.5$ | $n_{12} = 1.71300$ | $\nu_{12} = 53.9$ |
| | $r_{21}=200.0$ | | | |

Field stop S is placed at 4.3 mm before the surface $r_{14}$ which is the surface of the eye-piece $L_2$ nearest to an object.

In this embodiment, the erect prism P is arranged movable in unit with the compensator group $L_{13}$, it is possible to move the erect prism P together with the variator group $L_{12}$. Further, although the magnification in this embodiment is $6^x$–$12^x$, it is easily realized to change the magnification range by replacing the eye-piece with other eye-piece.

According to the erect type zoom telescopic optical system of this invention, the erect prism is placed between the variator group and compensator group so as to effectively utilize the air space, a high quality zoom binocular is realized by a compact and simple structure of the lens groups. Further as for the eye-piece it is sufficient enough to use the same lens as that for fixed magnification binocular, it becomes possible to obtain wide apparent field of view and to fix the field stop as the space image is formed always at a definite position.

In the above illustration, the objective lens system consists of three (3) groups, it is possible to constitute it with four (4) groups. It is also possible to constitute each group with a plurality of lens components for further improving the correction of aberrations. Even if the constitution of each lens group becomes complex, it is written the scope of this invention as the erect prism should be placed between the lens group functioning mainly as variator and the lens group functioning mainly as compensator. As for erect prism, dach (or roof) prism and porro-prism are known, it is preferable in this invention to use dach prism having the respective optical axes of the light incident and exit surfaces of the prism on the same linear line since the lens groups sandwiching the prism moves. By using such prism, mechanism for moving lens groups becomes more simple and easier to manufacture.

Further, in the embodiment, the focusing is made by moving on the optical axis the positive lens $L_{11}$ positive nearest to an object, however, it is also possible to fix the positive lens $L_{11}$ and to move the field stop and the eye-piece in unison on the optical axis for realizing focusing.

I claim:

1. An erect type zoom telescopic optical system comprises:
    (a) a positive lens group positioned nearest to an object side and movable along the optical axis for focusing;
    (b) a variator group positioned next to the positive lens group and movable along the optical axis for varying magnification;
    (c) a compensator group positioned at the image side of the variator group and movable interlocking with the variator group along the optical axis for forming an image of the object at a predetermined definite position;
    (d) an image erecting prism member positioned between the variator group and the compensator group for erecting the image;
    (e) a field stop positioned at said definite position where the image of the object is formed; and
    (f) an eye-piece for observing the image of the object formed at said field stop.

2. The optical system according to claim 1, in which said erect prism is movable in unison with either of the variator group and compensator group.

3. The optical system according to claim 2, in which said variator group has a negative refractive power, the compensator group has a positive refractive power and the erect prism member is movable together with the compensator group.

4. The optical system according to claim 3, in which the absolute value of the refractive power of the variator group is smaller than that of the positive lens group for focusing.

5. The optical system accordng to any one of claim 2, 3 or 4, in which said erect prism member has the respective optical axes of the light incident surface and exit surface on the same linear line.

6. The optical system according to claim 4, in which said positive lens group comprises a biconvex positive lens component and a negative meniscus lens component having convex surface at the image side, both components being separated with each other;

said variator group comprises a biconcave negative lens component; and the compensator group comprises a cemented biconvex positive lens component.

7. The optical system according to claim 6, in which said eye-piece comprises successively in order from the object side a cemented positive meniscus lens component convex toward the image side having the cemented surface convex toward the object side, a biconvex positive lens component having a cemented surface convex toward the image side and a positive lens component having stronger curved surface toward the object side.

8. The optical system according to claim 6, in which the positive lens group $L_{11}$, the variator group $L_{12}$, the erect prism P, the compensator group $L_{13}$ and the eye-piece $L_2$ have the following data, respectively, where r, d, n, $\nu$ denote radius of curvature, distance between adjacent surfaces, refractive index and Abbe number of each lens component,

| magnification $6^x$–$12^x$ | exit pupile diameter 3.0 mm |
|---|---|
| real field of view 10°–5° | apparent field of view 60° |
| eye relief 12.3 | |

| | | r | d | n | $\nu$ |
|---|---|---|---|---|---|
| $L_{11}$ | | $r_1=60.5$ | $d_1=8.0$ | $n_1 = 1.51680$ | $\nu_1 = 64.2$ |
| | | $r_2=-60.5$ | $d_2=1.6$ | | |
| | | $r_3=-58.0$ | $d_3=2.0$ | $n_2 = 1.74950$ | $\nu_2 = 35.1$ |
| | | $r_4=-157.731$ | $d_4=23.376$ ~43.404 | | |
| $L_{12}$ | | $r_5=-120.0$ | $d_5=2.0$ | $n_3 = 1.51680$ | $\nu_3 = 64.2$ |
| | | $r_6=153.577$ | $d_6=22.056$ ~30.806 | | |
| P | | $r_7=\infty$ | $d_7=29.66$ | $n_4 = 1.56883$ | $\nu_4 = 56.0$ |
| | | $r_8=\infty$ | $d_8=0.4$ | | |
| | | $r_9=\infty$ | $d_9=46.96$ | $n_5 = 1.56883$ | $\nu_5 = 56.0$ |
| | | $r_{10}=\infty$ | $d_{10}=14.989$ | | |
| $L_{13}$ | | $r_{11}=49.016$ | $d_{11}=5.5$ | $n_6 = 1.60311$ | $\nu_6 = 60.7$ |
| | | $r_{12}=-25.0$ | $d_{12}=1.5$ | $n_7 = 1.75520$ | $\nu_7 = 27.5$ |
| | | $r_{13}=-53.2$ | $d_{13}=35.447$ ~6.852 | | |
| $L_2$ | | $r_{14}=-29.5$ | $d_{14}=1.5$ | $n_8 = 1.80518$ | $\nu_8 = 25.5$ |
| | | $r_{15}=17.4$ | $d_{15}=8.5$ | $n_9 = 1.62041$ | $\nu_9 = 60.3$ |
| | | $r_{16}=-20.2$ | $d_{16}=0.2$ | | |
| | | $r_{17}=50.0$ | $d_{17}=6.0$ | $n_{10} = 1.62041$ | $\nu_{10} = 60.3$ |
| | | $r_{18}=-17.4$ | $d_{18}=1.5$ | $n_{11} = 1.80518$ | $\nu_{11} = 25.5$ |
| | | $r_{19}=-50.0$ | $d_{19}=0.2$ | | |
| | | $r_{20}=16.6$ | $d_{20}=4.5$ | $n_{12} = 1.71300$ | $\nu_{12} = 53.9$ |
| | | $r_{21}=200.0$ | | | |

Field stop S is placed at 4.3 mm before the surface $r_{14}$ which is the surface of the eye-piece $L_2$ nearest to an object.

* * * * *